United States Patent [19]

Wagner et al.

[11] 4,346,693
[45] Aug. 31, 1982

[54] SOLAR PANEL

[76] Inventors: Gerard Wagner, 1202-2075 Commox St.; Klaus Schmid, 1365 Laburnum St., both of Vancouver, British Columbia, Canada

[21] Appl. No.: 202,845

[22] Filed: Oct. 31, 1980

Related U.S. Application Data

[63] Continuation-in-part of Ser. No. 91,325, Nov. 5, 1979, abandoned.

[51] Int. Cl.³ ................................................ F24J 3/02
[52] U.S. Cl. .................................. 126/434; 126/435; 126/449
[58] Field of Search ............... 126/432, 433, 434, 435, 126/437, 449, 450, 432, 400

[56] References Cited

U.S. PATENT DOCUMENTS

| | | | |
|---|---|---|---|
| 3,987,782 | 10/1976 | Meire, Jr. | 126/434 |
| 4,007,728 | 2/1977 | Guba | 126/449 |
| 4,050,508 | 9/1977 | Buckley | 126/434 |
| 4,083,359 | 4/1978 | Smith | 126/433 |
| 4,095,585 | 6/1978 | Oquidam | 126/435 |

Primary Examiner—James C. Yeung
Attorney, Agent, or Firm—Townsend and Townsend

[57] ABSTRACT

A solar panel having an interior insulated heat storage means, a solar radiation collector wall mounted on a first side of the storage means having a collector surface for exposure to solar radiation and a heat emitter wall mounted on a second side of the heat storage means opposite the first side having an emitter surface for exposure to a space to be heated. The panel further includes a collector fluid conducting path for the conduction of collector fluid around an endless loop from a primary portion where there is heat exchanging contact with the collector wall to a secondary portion where there is heat exchanging contact with an emitter fluid in the interior heat storage means. Emitter fluid is contained within an emitter fluid conducting path which moves around an endless loop from a primary portion where there is heat exchanging contact with the collector fluid and the heat storage means to a secondary portion where there is heat exchanging contact with the emitter wall. A heat exchanger panel located within the interior heat storage means has an outer surface in thermally conductive association with the collector fluid in the secondary portion of the collector fluid path and an inner surface in thermally conductive association with the emitter fluid in the primary portion of the emitter path. The collector and the emitter walls each are made of a heat conducting sheet material. The panel construction provides an improved heat collection and transfer efficiency to an interior space to be heated.

10 Claims, 4 Drawing Figures

SOLAR PANEL

BACKGROUND OF THE INVENTION

The present application is a continuation-in-part of U.S. application Ser. No. 091,325 filed Nov. 5, 1979, abandoned.

The present invention relates to a solar panel for extracting heat from solar radiation and emitting the latter to an interior space to be heated and to heat domestic water.

A refinement of conventional solar panels is to include a heat storage medium intermediate a heat collector and a heat emitter to receive heat from the collector, store it and transmit it to the emitter. One such panel is disclosed by U.S. Pat. No. 4,095,585 issued on Jan. 20, 1978 to Oquidam. The latter device utilizes three separate volumes of fluids and provides two circuits, one for taking heat absorbed by a collector to one or possibly two fluid volumes and the other to take heat which has been absorbed by a second volume(s) from the first volume(s). Heat transfer from the collector to a heat carrying fluid in the first circuit is impeded by the large number of conducting materials to be traversed by the flow of heat. For example, heat which is absorbed by thin slats 14 must flow along the length of these slats to a pipe to which these slats are affixed, then through the pipe to a heat carrying fluid. The conductivity along the thin slats as well as the contact resistance between the slats and the pipe limits the latter flow. There are other similar factors which limit the heat flow during the remainder of its path. The many elements involved in limiting conductivity reduce overall heat transfer efficiency. Moreover, the thermal conductivity of the stored fluids themselves limit overall heat transfer efficiency significantly.

A second reason for the relative inefficiency in conventional panels lies in a use of a flat surface to absorb solar radiation. Ideally, to absorb a maximum amount of solar radiation, solar panels should be mounted so that they can rotate with the sun in order to maintain a maximum solid angle subtended by the collecting surface from the sun. However, because of the installation expense and the energy involved in moving such panels, movable panels are obviously impractical.

One type of textured surface employed to improve the absorption per unit solid angle subtended from the sun is disclosed by U.S. Pat. No. 4,007,728 issued Feb. 15, 1977 to Guba. Guba employs a plurality of raised generally truncated pyramidal portions having triangular bases. The flat tops of the pyramids in the flat areas between the triangles are painted with a black heat absorbing material while the sides of the pyramids are reflective. The reflective surfaces are designed to direct low angle solar radiation onto the flat absorptive surfaces. Although the Guba surface is an improvement over a flat surface, by making the sides of the pyramids reflective it reduces the overall surface available for absorption. Secondly, the back side of the Guba surface does not provide a very smooth surface over which the heat collecting fluid may flow. As a result, the transfer of heat from collector to the moving fluid is relatively inefficient.

SUMMARY OF THE INVENTION

According to the invention there is provided a solar panel including an interior insulated heat storage means, a solar radiation collector wall mounted on a first side of the heat storage means for having a collector surface exposure to radiation and a solar radiation emitter wall mounted on a second side of the heat storage means opposite the first side having an emitter surface for exposure to a space to be heated. The panel further includes a collector fluid conducting path which directs collector fluid around an endless loop from a primary portion where there is heat exchanging contact with the solar radiation collector wall to a secondary portion where there is heat exchanging contact with an emitter fluid and the interior heat storage means. The emitter fluid thus conducted around an endless emitter fluid path from a primary portion wherein there is heat exchanging contact with the collector fluid and the interior heat storage means to a secondary portion wherein there is heat exchanging contact with the emitter wall. Further included is an heat exchanger panel located within the interior heat storage means having an outer surface which is in thermally conductive association with the collector fluid in the secondary portion of the collector fluid path and an inner surface which is in thermally conductive association with the emitter fluid in the primary portion of the emitter fluid path. The collector and emitter walls each are made of a heat conducting sheet material.

The panel further comprises an interior heat storage means which includes a storage fluid conducting path for directing storage fluid around an endless loop from the secondary portion of the collector fluid path wherein there is heat exchanging association with the collector fluid to the primary portion of the emitter fluid path where there is heat exchanging association with the emitter fluid.

The panel includes a pair of insulation panels, one being between the primary and secondary portions of each of the collector and emitter fluid paths.

The storage fluid in the storage fluid path may be separated from the collector fluid in the secondary portion of the collector fluid path and from the emitter fluid in the primary portion of the emitter fluid path by walls of the heat conducting sheet material. In order to optimize heat transfer efficiency the walls of the heat conducting sheet material in the second portion of the collector path and the primary portion of the emitter fluid path are traversed by passageways which permit collector fluid in the secondary portion of the collector fluid path and emitter fluid in the primary portion of the emitter fluid path to flow into contact with associated sides of the heat exchanger panel.

Advantageously, the heat conducting sheet material has a front face with a plurality of uniformly shaped recesses, the recesses each being within an equilateral triangle and the triangles defining an array. Each edge of each triangle is shared by an adjacent triangle and the recesses define the approximate shape of an inverted pyramid which has an equilaterally triangular base, equal side edges and the length of one edge of the base equal to $2\sqrt{6}$ times the depth of the pyramid. The back surface of the heat conducting sheet material forms an array of straight interconnected fluid-carrying channels.

The backside of the textured sheet material when so shaped in completely wetted by the collector fluid thus providing an immediate heat exchange and fast removal of the collected heat.

By providing a textured surface which is completely darkened the total area of the textured surface is available for absorbing the suns rays.

An additional improvement is obtained by providing a transparent cover which is also formed by a plurality of inverted pyramidal recesses similar to those of the heat conducting sheet material aforesaid. Such transparent covers reduce the reflection of the sun rays in comparison to reflection which occurs with an ordinary flat transparent cover.

DESCRIPTION OF THE PREFERRED EMBODIMENTS

Figure 1:
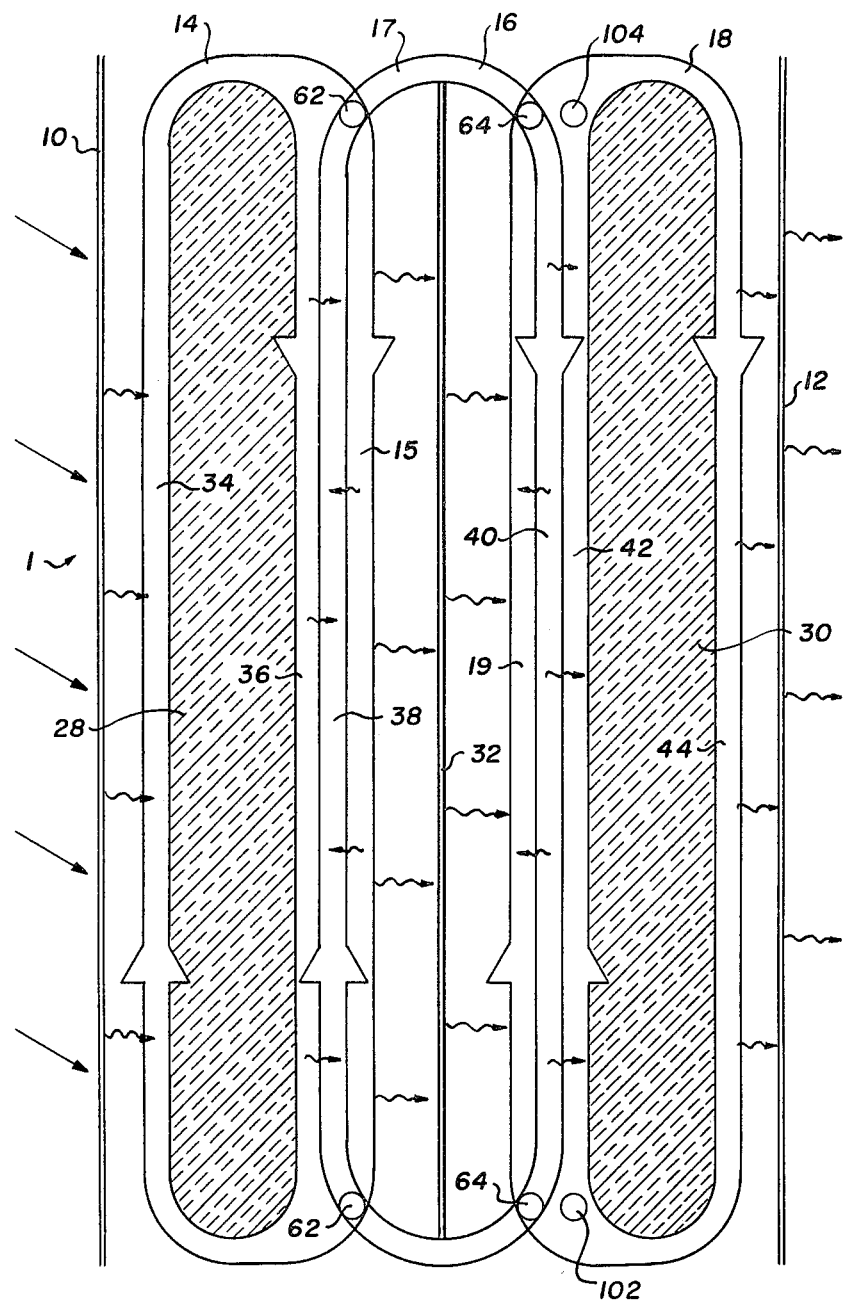
FIG. 1 is a schematic diagram showing the main components of the panel together with their operation.

In FIG. 1, the panel 1 includes an interior collector chamber 14, a storage chamber 16 and an emitter chamber 18 between a collector surface 10 of a collector wall 24 and a emitter surface 12 of an emitter wall 26. Each of these chambers is a vertically elongate loop and adjacent chambers are in thermally conductive association with each other. The vertically directed arrowheads formed on the chambers indicate the direction of flow of the collector fluid 15, storage fluid 17 and distributor fluid 19 within the chambers. The inclined arrows to the left of FIG. 1 represent solar radiation striking collector surface 10, while the remaining horizontal arrows represent the transfer of heat. The portion 34 of collector chamber 14 is heated by conduction from a back surface of collector wall 24 whose collector surface 10 is heated by the sun. An insulating panel 28 separates primary portion 34 of chamber 14 from secondary portion 36. Secondary portion 36 extends to the opposite side of portion 38 of the storage chamber 16 through the apertures 62 in the storage chamber. Accordingly, the collector fluid within portion 36 of collector chamber 14 heats both sides of portion 38 of storage chamber 16.

Portion 36 of the collector chamber 14 is separated from the emitter fluid 19 in primary portion 42 of emitter chamber 18 by the vertically extending heat exchanger panel 32. Heat is transferred directly to emitter fluid 19 from collector fluid 15 through exchanger panel 32.

Since heat is transferred to primary portion 34 of collector chamber 14 from the collector wall 10 and is transferred from secondary portion 36 to primary portion 38 of the storage chamber 16 and to a primary portion 42 of emitter chamber 18 through heat exchanger panel 32, convection currents are set up within collector chamber 14 to circulate fluid 15 in the direction indicated by the arrows.

Similarly, heat is transferred to storage fluid 17 in primary portion 38 of storage chamber 16 from collector fluid 15 in the secondary portion 36 of collector chamber 14 and is transferred to the emitter fluid 19 in portion 42 of emitter chamber 18 from portion 40 of the storage chamber. The heat absorption and transferral aforesaid results in convection currents in storage chamber 16 which cause circulation of the storage fluid 17 in the direction indicated by the arrows.

Finally, in emitter chamber 18, portion 42, as mentioned, is heated by the collector fluid 15 through heat exchanger panel 32 and by the storage fluid 17 in the secondary portion 40 of the storage chamber. When heat is transferred by conduction to emitter wall 26 and radiated by emitter surface 12 to an area to be heated, convection currents are formed in the emitter chamber 18 which circulate the emitter fluid in the direction indicated by the arrows.

Figure 2:
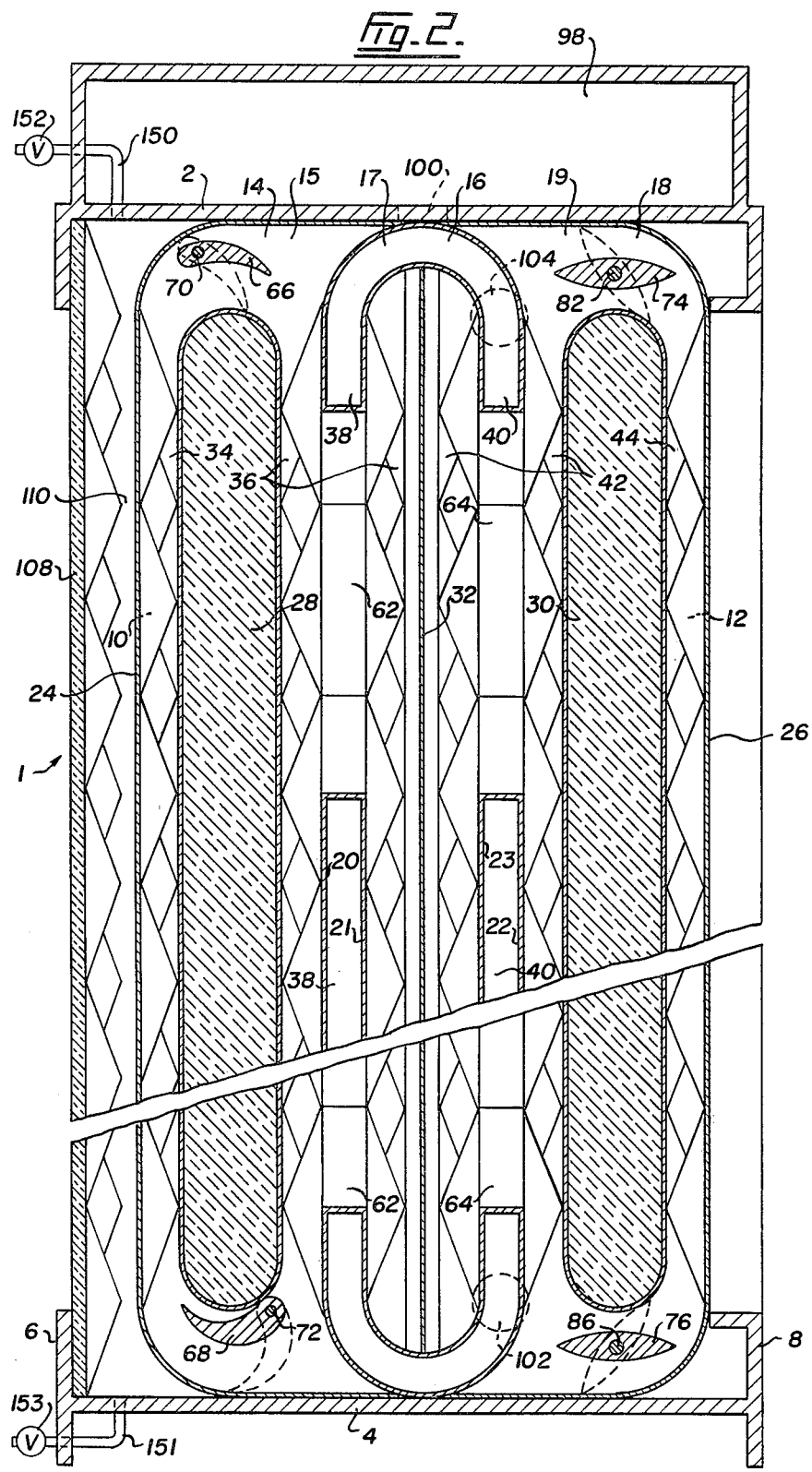
FIG. 2 is an end view in section of the panels showing its construction.

FIG. 2 illustrates more fully the solar panel 1 which may be used vertically or inclined as a modular building component which inherent insulating capacity. Panel 1 has a top 2, a bottom 4 and opposite ends 6 and 8. The front face of panel 1 comprises wall 24 having collector 10 for exposure to solar radiation. The back face of the panel, on the side opposite the collector surface 10 comprises an emitter wall 26 having an emitter surface 12 for radiating heat to an area to be heated. The interior of panel 1 is divided into collector chamber 14 and heat emitter and storage means comprising storage chamber 16 and emitter chamber 18 by dividing walls 20, 21, 23 and 22. The collector wall 24 and emitter wall 26 comprise outer dividing walls. All of the dividing walls are of a thermally conductive material, such as copper, so that fluids within the chambers are in thermally conductive association with each other and with the walls 24 and 26. In the preferred embodiment of FIG. 2 walls 20, 21, 22, 23, 24 and 26 are formed of an heat conducting sheet material, with the array of pyramidal recesses as seen best in FIGS. 3 and 4 and described more fully below.

Each of the chambers 14, 16 and 18 form endless loops which may be inclined or vertical when the panel is oriented for use as shown in FIG. 2. The loops are formed around the insulating means constituting insulating panels 28 and 30, which extend from near the top to near the bottom of the vertically elongate chambers 14 and 18, and around the heat exchanger panel 32. Panels 28 and 30 are fabricated of an insulating material such as urethane foam. The collector chamber 14 therefore has an outside primary portion 34 which extends between insulating panel 28 and dividing wall 24 while its inside secondary portion 36 is between the panel 28 and heat exchanger panel 32. Portions 34 and 36 of collector chamber 14 are interconnected above and below insulating panel 28. Similarly, storage chamber 16 has a primary portion 38 and a secondary portion 40, while emitter chamber 18 has an inside primary portion 42 and an outside secondary portion 44.

Portion 36 of collector chamber 14 extends through apertures 62 in portion 38 of storage chamber 16 to corrugated heat exchanger panel 32. Similarly, portion 42 of the emitter chamber 18 extends to the opposite side of storage chamber 16 through apertures 64 in portion 40 of storage chamber 16.

Various collector fluids 15 could be used, but a water and antifreeze solution is preferred. As collector surface 10 is heated by the sun, the heat is transferred by conduction through collector wall 24 to the collector fluid 15 within vertically elongate outside portion 34 of the collector chamber 14. The temperature differential which arises causes the fluid 15 to circulate upwardly and over the top of insulating panel 28. The fluid 15 then circulates down the secondary portion 36 of collector chamber 14 where it heats the storage medium in the primary portion 38 of storage chamber 16 by conduction through dividing walls 20 and 21 and heats the emitter chamber 18 through heat exchanger panel 32.

The convection current carries the collector fluid 15 downwardly below insulating panel 28 where it is again circulated upwardly and heated by collector surface 10.

When the collector fluid 15 is no longer heated by solar radiation, for example, at night or during away clouding, it is desirable to prevent a reverse flow of heat from the storage medium to the collector wall 24. This would arise due to radiative cooling from the collector surface 10 of collector wall 24 and hence cooling of the collector fluid 15 in the primary portion 34 of the collector path or chamber 14. To stop this, the collector chamber 14 is provided with check valve means which, in the preferred embodiment, comprises a pair of curved flaps 66 and 68 pivotally mounted on shafts 70 and 72, respectively, and extending laterally across the chamber 14 above and below insulating panel 28. During the normal circulation of collector fluid upwardly through portion 34 of collector chamber 14 and downwardly through portion 36, the movement of fluid holds flaps 66 and 68 in the open position, shown in solid lines, thereby permitting the flow of fluid. However, once the circulation of fluid stops, as occurs when collector surface 10 heats the fluid at the same rate as walls 20 and 21 and panel 32, the flaps 66 and 68 drop to the closed position, shown in broken lines, and prevent a reverse flow of fluid 15 upwardly through portion 36 of chamber 14 and downwardly through portion 34. In essence therefore, flaps 66 and 68 not only act as check valves for the collector fluid 15 within the chamber 14, but also act as check valves to prevent a reverse flow of heat from the storage medium in chamber 16 to collector wall 24.

Emitter chamber 18 is essentially similar in configuration to collector chamber 14 and contains heat carrying emitter fluid 19 which is preferably water so that it can be distributed as ordinary domestic hot water. The fluid within inside portion 42 of emitter chamber 18 is heated in two ways. Firstly, it is directly heated by the heat exchanger panel 32 by means of the collector fluid 15 in heating portion 36 of collector chamber 14 passing through apertures 62. Secondly, the emitter fluid 19 is heated by the storage medium through dividing walls 22 and 23 separating chamber 18 from storage chamber 16. The heating of the emitter fluid 19 causes convection currents within emitter chamber 18 to circulate the fluid 19 upwardly through portion 42 and downwardly through portion 44. Heat from the emitter fluid 19 in portion 44 passes by conduction through emitter wall 26 and is radiated from emitter surface 12 to the area requiring space heating. As with the collector chamber 14, emitter chamber 18 has a pair of similar flaps 74 and 76 for controlling the circulation of fluid within the chamber.

In order to prevent overheating of the interior area and to conserve heat, flaps 74 and 76 can be closed by a device, (not shown), which may be manually or thermostatically controlled, for stopping the heat carrying emitter fluid from circulating within emitter chamber 18 when heat is not required. The device employed consists of a manually operable dial (not shown) coupled to each of shafts 86 and 82. Alternatively, flaps 74 and 76 can be held in an open position to allow a reverse flow of fluid in the emitter path so that heat may be absorbed from an interior space and stored.

The construction and operation of storage chamber 16 is generally the same as for collector chamber 14 and emitter chamber 18, although there is no need for check valve means to limit the fluid flow to one direction only.

The storage medium 17 within chamber 16 of the preferred embodiment is a fluid, at least when heated, and may comprise a latent heat storage medium referred to as a phase change material (P.C.M.), with a melting point suitable for the intended temperature range. For example paraffins of selected molecular composition or solutions with hydrated salts may be used.

Since substantial expansion of the storage medium may occur upon heating, an expansion chamber 98 is provided on the top of panel 1 and is connected to storage chamber 16 by means of conduit 100. It should be noted that the heating of the storage medium does not provide a lag in the operation of the solar panel. As soon as heat is available at collector wall 24, the collector fluid 15 within chamber 14 is circulated and can pass directly to the heat exchanger panel 32 which heats the emitter fluid 19. The heated emitter fluid 19 immediately circulates around to emitter wall 26 and radiates heat from emitter surface 12. Additionally, when the emitter fluid is water, an inlet pipe 102 and outlet pipe 104 are connected to the panel so that the hot water can be circulated through a domestic hot water system.

Figure 3:
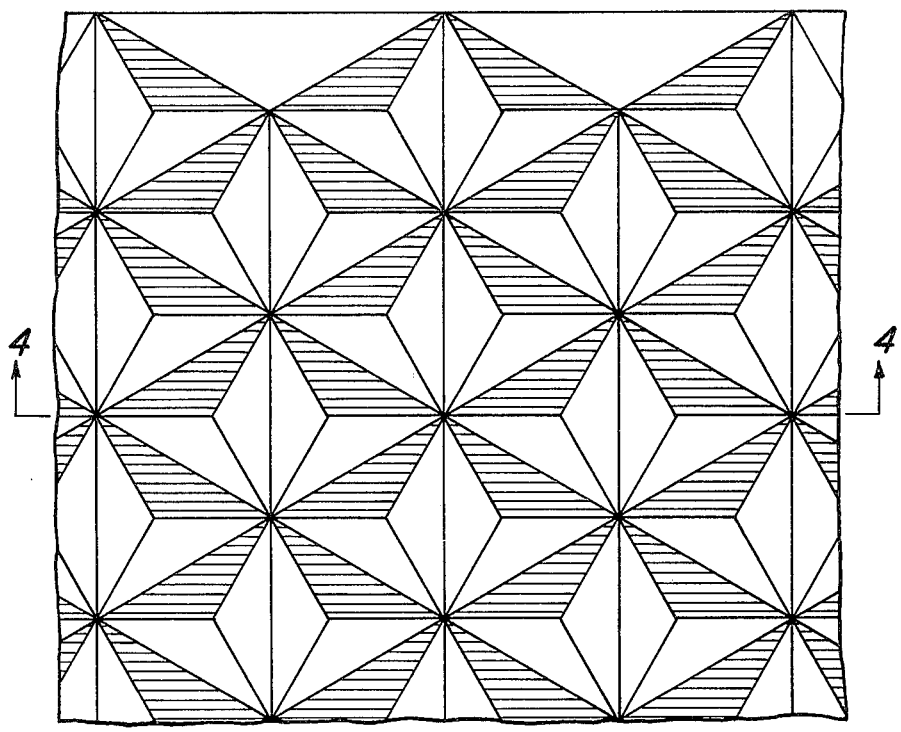
FIG. 3 is a plan view of a portion of a solar radiation absorbing surface.
Figure 4:
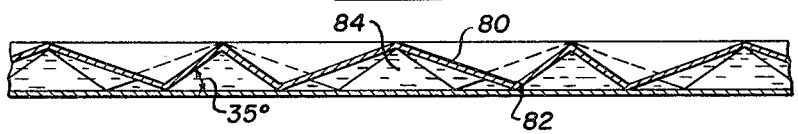
FIG. 4 is a sectional view of the solar radiation absorbing surface taken along line 4—4 of FIG. 3.

Since all of the dividing walls 20, 21, 22, 23, 24, and 26 transfer heat by conduction, their effectiveness is increased when their surface areas are increased. Their efficiency can therefore be increased by providing any textured or convoluted shape such as the corrugaged shape of panel 32. However, in the preferred embodiment, all of these dividing walls are provided with a textured surface comprising a plurality of adjacent pyramids 80 as seen in FIGS. 3 and 4 for dividing walls 24 and 26. In the case of collector surface 10 and emitter surface 12, the pyramids are recessed. As easily seen, the bases 82 are equilateral triangles of the same size. As shown in FIG. 4 the sides of the pyramids make an angle of approximately 35° with the base. This particular shape of textured surface provides particular advantages for the collector surface 10. As may be appreciated for a stationary panel it is desirable to provide a shape for a collector surface which will optimally collect solar radiation regardless of the travel of the sun. The collector surface 10 employs a plurality of adjacent triangular recessed pyramids which fully occupy the surface. The particular proportions of the pyramids is an approximation of a spherical surface, resulting in the angle of approximately 35° between the sides of the pyramids and their bases. This is equivalent approximately to a pyramid having a height related to one side of the base in the proportion of 1:2 6. When the sun travels, each of the recessed pyramids 80 on a properly positioned panel can present at least one side generally towards the sun and the radiation is absorbed by surface 10 without undue reflection.

The reversed (back) side of walls having such textured surfaces has a plurality of vertical and diagonally interconnecting channels 84 thus providing a conduit with an optimal wetted surface.

As with most solar panels, there is a transparent cover 108 covering the collector surface 10 and spaced-apart therefrom. The space 110 between the collector surface 10 and cover 108 may be vented by tubes 150 and 151 and valves 152 and 153 to remove excess heat from the panel in case of overheating. As shown best in FIG. 2 the transparent cover 108 is also shaped like a plurality of adjacent triangular pyramids in the manner of the dividing walls in order to reduce reflection.

Modification can be made to the preferred embodiment described above within the scope of the present invention. For example, the heat storage chamber could comprise a series of pipe loops or the conduits at either end of the storage loop which connect primary and secondary portions thereof could be eliminated to create two independent storage chambers. Alternatively, the storage chamber could be eliminated. The heat would then be stored in the secondary portion of the collector chamber and the primary portion of the emitter chamber.

Although in the preferred embodiment described above heat exchanger panel 32 is corrugated it will be appreciated that any type of texturing of its surfaces that increases its surface area in contact with the collector and emitter fluids will increase its heat transfer efficiency.

Similarly dividing walls 24 and 26 could be corrugated or some other simplified shape if reduced efficiency were acceptable.

We claim:

1. A solar panel, comprising:
   an interior heat storage means;
   a solar radiation collector wall mounted proximate a first part of said heat storage means having a collector surface for exposure to solar radiation;
   a heat emitter wall mounted proximate a second part of said heat storage means opposite the first part thereof having an emitter surface for exposure to a space to be heated;
   a collector fluid conducting path for directing a collector fluid around an endless loop from a primary portion of the loop wherein there is heat exchanging contact with said solar radiation collector wall to a secondary portion of the loop wherein there is heat exchanging contact with an emitter fluid and the first part of said interior heat storage means,
   an emitter fluid conducting path for directing emitter fluid around an endless loop from a primary portion of the loop wherein there is heat exchanging contact with the collector fluid and the second part of said interior heat storage means to a secondary portion of the loop wherein there is heat exchanging contact with said emitter wall;
   an heat exchanger panel located within said interior heat storage means having an outer surface which is in thermally conductive association with the collector fluid in the secondary portion of said collector fluid path and an inner surface which is in thermally conductive association with the emitter fluid in the primary portion of the emitter path;
   a pair of insulation panels one between the primary and secondary portions of the collector fluid conducting path and the other between primary and secondary portions of the emitter conducting fluid path;
   wherein said collector and emitter walls each are made of a heat conducting sheet material, and
   wherein said interior heat storage means further includes a storage fluid conducting path for directing a storage fluid around an endless loop from the secondary portion of the collector fluid path wherein there is heat exchanging association with the collector fluid to the primary portion of the emitter fluid path wherein there is heat exchanging association with the emitter fluid.

2. A solar panel as defined in claim 1, further comprising check valve means for controlling the fluid flow between primary and secondary portions of each of said collector and emitter fluid paths.

3. A solar panel as defined in claim 2, wherein the storage fluid in the storage fluid path is separated from the collector fluid in the secondary portion of the collector fluid path and from the emitter fluid in the primary portion of the emitter fluid path by walls of the heat conducting sheet material.

4. A solar panel as defined in claim 3, wherein the walls of the heat conducting sheet material in the secondary portion of the collector path and the primary portion of the emitter fluid path are traversed by passageways which permit collector fluid in the secondary portion of the collector fluid path and emitter fluid in the primary portion of the emitter fluid path to flow into contact with associated sides of said heat exchanger panel.

5. A solar panel as defined in claim 2 wherein the heat conducting sheet material has a front surface with a plurality of uniformly shaped recesses, the recesses each being within a equilateral triangle with the triangles defining an array in which
   each edge of each triangle is shared by an adjacent triangle and the recesses defining approximately the sides of an inverted pyramid having an equilaterally triangular base, equal side edges and the length of one edge of the base equal to $2\sqrt{6}$ times the depth; and
   whereby the back surface of said heat conducting sheet material forms an array of straight, interconnected fluid-carrying channels.

6. A solar panel as defined in claim 5, further comprising a transparent cover over said solar radiation collector surface and means for venting a space between said cover and said collector surface to the atmosphere.

7. A solar panel as defined in claim 6, wherein said transparent cover is a transparent sheet material whose outer face has a plurality of uniformly shaped recesses, the recesses each being within an equilateral triangle with the triangles defining an array in which each edge of each triangle is shared by an adjacent triangle and the recesses defining approximately the sides of an inverted pyramid having an equilaterally triangular base, equal side edges and the length of one edge of the base equal to $2\sqrt{6}$ times the depth.

8. A solar panel as defined in claims 2, 3 or 4 wherein said check valve means are pivotable flaps located above and below each insulation panel for controlling fluid flow through said collector and emitter fluid paths.

9. A solar panel as defined in claims 1, 2 or 5 further comprising an inlet conduit and an outlet conduit each connected to the primary portion of the emitter fluid path for withdrawal of emitter fluid to a remote location, extraction of heat from the latter and return of the cooled emitter fluid to the emitter fluid path.

10. A solar panel as defined in claim 1, or 5 wherein the front surface of said collector sheet material is darkened to enhance its sheet radiation absorption properties.

* * * * *